No. 730,592. PATENTED JUNE 9, 1903.
J. H. ALLISON.
CHECK HOOK.
APPLICATION FILED APR. 19, 1902.
NO MODEL.
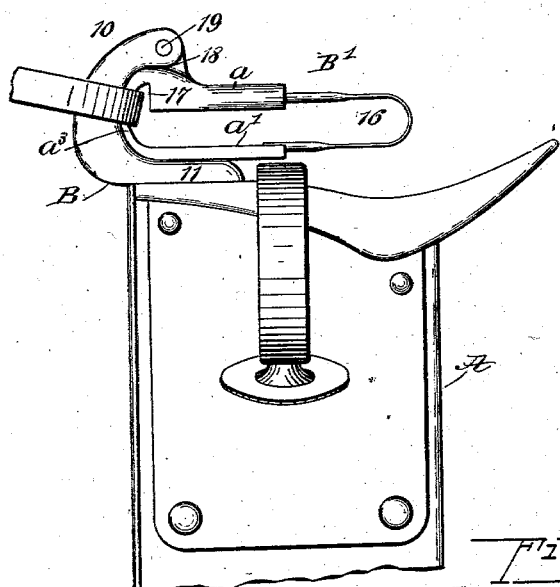
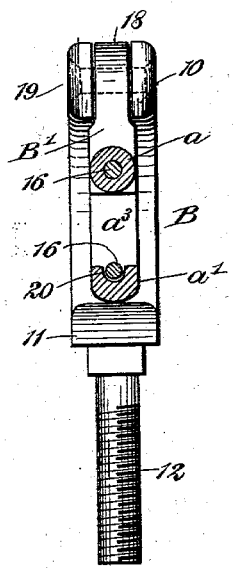
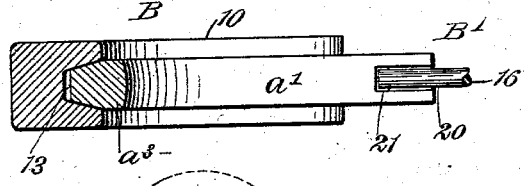
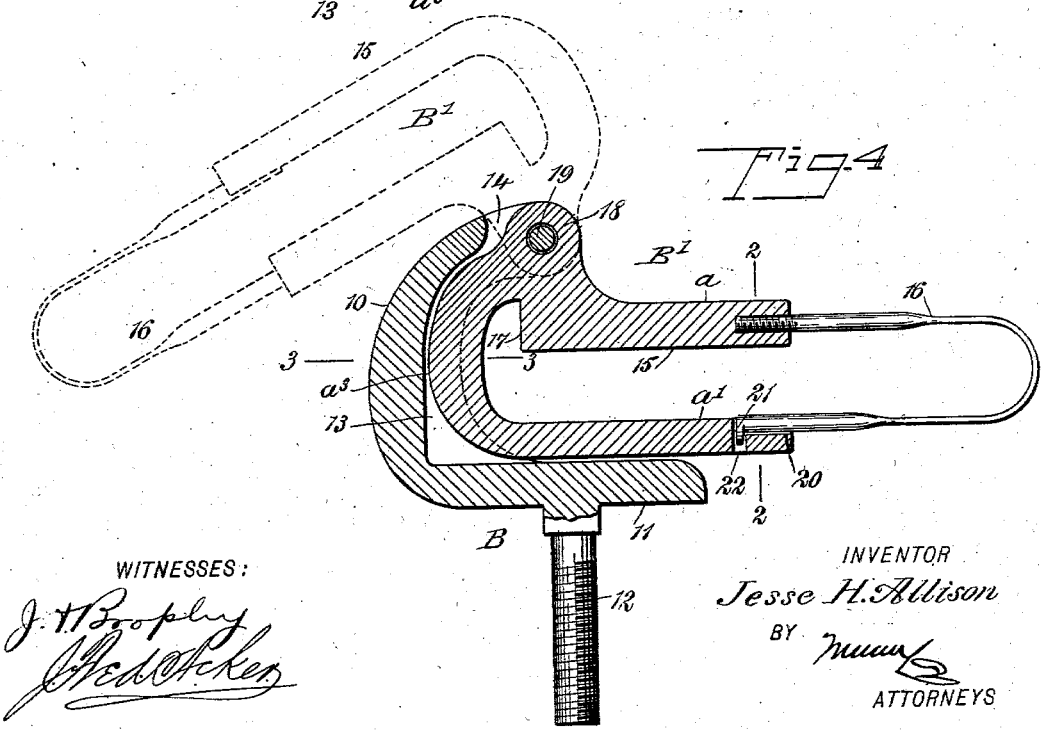
WITNESSES:
INVENTOR
Jesse H. Allison
BY
ATTORNEYS No. 730,592. Patented June 9, 1903.

UNITED STATES PATENT OFFICE.

JESSE H. ALLISON, OF NEW VIENNA, OHIO.

CHECK-HOOK.

SPECIFICATION forming part of Letters Patent No. 730,592, dated June 9, 1903.

Application filed April 19, 1902. Serial No. 103,732. (No model.)

*To all whom it may concern:*

Be it known that I, JESSE H. ALLISON, a citizen of the United States, and a resident of New Vienna, in the county of Clinton and State of Ohio, have invented a new and Improved Check-Hook, of which the following is a full, clear, and exact description.

My invention relates to check-hooks adapted for attachment to the back-band harness-tree with or without the usual saddle.

The purpose of the invention is to provide a simple, economic, and durable check-hook so constructed that when a rein is held in by the hook it cannot be displaced, and whereby the rein may be quickly and conveniently dropped forward after being separated from the hook a sufficient distance to allow the animal freedom to drink and to move his head to and from his sides, and whereby, further, by one movement of the hand the checkrein may be again carried to checking position on the hook.

Another purpose of the invention is to provide means for quickly and conveniently passing the checkrein into the hook or disengaging it entirely therefrom.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved hook shown attached to the saddle. Fig. 2 is a vertical section on the line 2 2 of Fig. 4. Fig. 3 is a horizontal section taken practically on the line 3 3 of Fig. 4; and Fig. 4 is a vertical central section through the improved check-hook, the hook being in position for checking action on a checkrein and illustrating in dotted lines the position of the carrier of the hook when the head of the horse is given freedom.

In Fig. 1 I have illustrated the check-hook applied to a saddle A; but said hook may be used in connection with any other suitable portion of a harness.

The hook is practically in two parts—a main body-section B and a carrier-section B'. The body-section comprises a rearwardly-curved hook member 10 and a straight base member 11, which is a continuation of the hook member and is shown provided with a threaded stud 12 for attachment to a harness; but the hook may be attached in any other approved manner. A channel 13 is made in the rear or inner face of the hook member 10, extending from the base 11 to the upper end of said member 10, connecting with an opening 14 at the extreme upper end of the hook member, as is best shown in Fig. 4, and the side walls of the channel 13 are preferably inclined toward the central portion of the front wall, rendering the channel 13 more or less V or wedge shaped in cross-section, as is illustrated in Fig. 3.

The carrier-section B' consists of a body-section 15 and a latch-section 16. The body-section of the carrier is made of non-yielding material and consists of two parallel members $a$ and $a'$, connected by a curved member $a^3$, the forward edge of which curved member is more or less wedge-shaped in cross-section and is adapted to fit into the channel 13 of the main body-section B. The forward edge of the curved end member $a^3$ is convexed and the inner or rear face concaved; but the curvature of the end member below its center at its inner face is more pronounced than the curvature above the center, as is shown in Fig. 4, and as the checkrein when in checking position and in engagement with the hook draws forward on the inner curved face of the end member $a^3$, as is shown in Fig. 1, the tendency of such curved surface will be to hold the rein down in the carrier; yet the rein is given sufficient play and is prevented from moving rearward by carrying the forward end of the upper member $a$ downward to form a wall or shoulder 17 a predetermined distance and at the rear of the inner or rear face of the said end member $a^3$ of the carrier-section.

The body member 15 of the carrier-section is provided with an upper knuckle 18 at the junction of its curved member $a^3$ with its upper member $a$, which knuckle is placed in the opening 14 in the hook of the main body B, and a pintle 19 is passed through the hook-body and knuckle, effecting a hinged connection between the main body B and the carrier-section B'.

The latch member 16 of the carrier-section B' is made of spring material and is preferably U-shaped, and one end is screwed in the body member $a$ of the carrier-section B', while the other end is adapted to normally lie in a groove 20 in the inner face of the member $a'$ of the carrier-section, as is shown in Fig. 4, and this free end of the latch member 16 is provided with a spur 21, which enters an aperture 22 in the member $a'$ and intersecting the groove 20.

In operation the checkrein is passed into the loop of the carrier-section B' by pressing the free end of the latch member out from its keeper, thus enabling a rein to be entered between the members of the carrier-section, and this is done preferably while the carrier-section is in its forward position out from the main body-section of the hook, as shown in dotted lines. When the horse's head is to be brought up, it is simply necessary to turn the carrier-section on its hinge rearward and downward, whereupon the rein traveling in the loop of the carrier-section will be brought to an engagement with the end member $a^3$ of the carrier-section, and the said member will be forced in the channel of the hook of the main section B, as is shown in Figs. 1 and 4, while the bottom of the carrier-section will rest firmly on the base of the main section, and as the tension of the carrier-section when the horse is checked is below and forward of the fulcrum of the carrier-section to the main section of the hook the greater the tension the more firmly will the carrier-section be wedged into the hook member of the main section. When it is desired to free the head of the animal, the carrier-section is carried upward and forward, dropping downward to a slightly-inclined position, (shown in dotted lines in Fig. 4,) and the rein will slip down into the latch member of the carrier-section, affording sufficient slack for the animal to lower his head to drink or move his head sidewise to free himself from flies or insects.

Having thus described my invention, I claim as new and desire to secure by Letters Patent—

1. In a check-hook, a main section comprising a hook, a base and means for attachment to a portion of a harness; and a carrier-section comprising parallel members forming a rigid loop connected by a curved member at one end and open at the other end; and a coöperating loop also open at one end, the two loop-sections being united at their open ends to form one continuous extended loop, the latter one of said loops being made of spring material with one of its ends rigidly attached to one of the ends of the coöperating loop, and the other end normally in continuous engagement with the other end of the coöperating loop, and adapted to be sprung inwardly therefrom to permit the insertion or removal of a rein; said rigid loop at the junction of its upper parallel member with the connecting curved member, being pivotally attached to the upper end of the hook of the main section, as specified and shown.

2. In a check-hook, a main section comprising a hook; a base and means for attachment to a portion of a harness; and a carrier-section comprising parallel members forming a rigid loop connected by a curved member at one end and open at the other end; and a coöperating loop also open at one end, the two loop-sections being united at their open ends to form one continuous extended loop, the latter one of said loops being made of spring material, with one of its ends rigidly attached to one of the ends of the coöperating loop, and the other end normally in continuous engagement with the other end of the coöperating loop, and adapted to be sprung inwardly therefrom to permit the insertion or removal of a rein; said rigid loop having a shoulder at the forward end of its upper parallel member, said latter member, at its junction with the aforesaid connecting curved member, being pivotally attached to the upper end of the hook of the main frame, as specified and for the purpose set forth.

3. A check-hook, comprising a main hook-section having a V-shaped groove in its rear edge, and adapted for attachment to a portion of a harness; an elongated carrier for the rein pivotally connected to the main hook-section at the top thereof and having a curved portion, V-shaped on its front side, adapted to be received into the V-shaped groove of the main hook-section; an elongated spring-loop at the rear end of the carrier, having an end adapted to be sprung in to permit the entering of a rein in the carrier, said loop forming an extension of the carrier, adapted when the carrier is swung forward to give free rein to the horse without loosening the rein from the carrier, as specified and for the purpose set forth.

4. A check-hook, comprising a main hook-section terminating in a base provided with means for attachment to a harness; said hook-section having a V-shaped groove in its rear side; an elongated carrier for the rein having two parallel sections connected together by a curved section, said carrier being pivotally connected at its front end to the top portion of the main hook, and adapted to swing on said pivot into a forward position; said curved portion of the carrier having its forward edge V-shaped to engage the V-shaped groove in the rear edge of the hook of the main section; said carrier being provided with a U-shaped extension, the upper section of said extension having threaded engagement with the end of one of the parallel sections of the carrier and the lower section thereof having a spur in engagement with an aperture in the end of the other parallel section of the carrier; said lower section of the extension being free to spring inwardly to permit the entering of a rein within the carrier, as specified and for the purpose set forth.

5. A check-hook, comprising a main section terminating in a base having means for attachment to a portion of a harness; an elongated rein-carrier having an upwardly-extending knuckle at the front end of its top section and pivoted in said knuckle at its front end to the top portion of said main section, to swing thereon, and thereby adapted to occupy a depending position forward of said pivot with its free forward end lower than its rear pivoted end and a horizontal position rearward of said pivot, the former to hold the rein loosely on the horse and the latter to hold it tight, as specified and for the purpose set forth.

6. A check-hook, comprising a main section having a base provided with means for attachment to a portion of harness; an elongated rein-carrier pivoted at its front end to the main section adapted to swing forwardly and backwardly thereon to occupy a position in front of said pivot and a position in the rear thereof respectively, the former to hold the rein loosely upon a horse and the latter to hold it tightly; the rear end of said carrier being formed of a piece of spring material having one end free to permit the insertion of the rein in the loop or its removal therefrom, as specified and for the purpose set forth.

7. A check-hook, comprising a main section having means for attachment to a portion of harness; an elongated rein-carrier having an upwardly-extending knuckle at the forward end of its top portion and pivoted in said knuckle to the main section and adapted by means of said upwardly-extending knuckle to swing forward upon said pivot to support the rein in the rear end of the holder forward of the main section with its free end depending into a position lower than its pivoted end to swing backwardly thereon to support the rein in the front end of the holder in the rear of the main section, as specified and for the purpose set forth.

8. A check-hook, comprising a main section having means for attachment to a portion of harness; and a rein-carrier consisting of an elongated loop, formed of two U-shaped sections, a front and a rear, the latter being made of spring material, and having one of its legs rigidly secured to one of the legs of the front section of the loop, and its other leg sprung against the other leg of said front section, and adapted to be sprung out of engagement therewith for the insertion or removal of a rein; said front section of the loop being provided with an upwardly-extending knuckle at the forward end of its top portion, and being pivoted in said knuckle to the main section and adapted to swing forward on said pivot to bring the rein to the rear end of the opening to cause said rein to be held loosely; and to swing backward on said pivot to bring the rein to the front end of the opening to hold it tightly upon the horse, as specified and for the purpose set forth.

9. A check-hook, comprising a main hook-section terminating in a base provided with means for attachment to a harness; said hook-section having a channel in its rear side; an elongated carrier for the rein having two parallel sections, connected together by a curved section, said carrier having an upwardly-extending knuckle at the front end of its top section, and being pivotally connected by said knuckle to the top portion of the main hook and thereby adapted to be swung into a depending forward position with its free end lower than its pivoted end; said curved portion of the carrier having its forward side shaped to fit the channel in the rear side of the hook of the main section; said carrier also being provided on its inner side with a shoulder at its front end, and having a U-shaped extension at its rear end, the upper section of said latter extension having rigid engagement with the end of one of the parallel sections of the carrier, and the lower section thereof having a springing engagement against the inner side of the end of the other parallel section of the carrier, and adapted to be sprung inwardly to permit the insertion or removal of a rein, as specified and for the purpose set forth.

In testimony whereof I have signed my name to this specification in the presence of two subscribing witnesses.

JESSE H. ALLISON.

Witnesses:
P. J. HIGGINS,
J. M. BETTERTON.